Aug. 23, 1966  J. R. SHEPARD  3,268,727
COMPUTER CONTROL FOR TRANSIT SYSTEM
Filed March 25, 1964  7 Sheets-Sheet 1

INVENTOR.
JACK R. SHEPARD
ATTORNEY

Aug. 23, 1966     J. R. SHEPARD     3,268,727
COMPUTER CONTROL FOR TRANSIT SYSTEM Filed March 25, 1964     7 Sheets-Sheet 4

INVENTOR.
JACK R. SHEPARD
BY
ATTORNEY

Aug. 23, 1966 J. R. SHEPARD 3,268,727
COMPUTER CONTROL FOR TRANSIT SYSTEM
Filed March 25, 1964 7 Sheets-Sheet 5

FIG.7

INVENTOR.
JACK R. SHEPARD
BY
ATTORNEY

Aug. 23, 1966      J. R. SHEPARD      3,268,727
COMPUTER CONTROL FOR TRANSIT SYSTEM
Filed March 25, 1964      7 Sheets-Sheet 6

FIG.9A

INVENTOR.
JACK R. SHEPARD
BY
ATTORNEY

United States Patent Office

3,268,727
Patented August 23, 1966

3,268,727
COMPUTER CONTROL FOR TRANSIT SYSTEM
Jack R. Shepard, Wayne, N.J., assignor to Gibbs & Hill, Inc., New York, N.Y., a corporation of New Jersey
Filed Mar. 25, 1964, Ser. No. 354,562
6 Claims. (Cl. 246—187)

This invention relates to computer control systems and, more particularly, to a fail-safe, computer controlled automatic signalling and train control system for railroads. This application is a continuation-in-part of application Serial No. 2,987 filed January 18, 1960, entitled Automatic Signalling and Train Control System.

Rail signalling systems have been developed to a high degree and are used to provide information to the train operator to enable him to control the train safely. Centralized traffic control has also been developed to enable a dispatcher to provide the train operator with additional information in order to expedite traffic movements.

Existing automatic signalling systems are based fundamentally upon insulated lengths of track, which are known as "blocks." The occupancy, or non-occupancy, of such blocks by rolling stock provides the means by which the train location is detected, and suitable operating margins are obtained by interconnecting two or more adjacent blocks through relay chains.

The basic signalling circuit for a block, referred to as a "track circuit," is provided by the rails included in that block. However, changes in physical and especially climatic conditions place limitations on the track circuit, and make necessary delicate margins of relay operation in order to detect the presence of trains. Due to the characteristics of the track circuit, there is a limit with respect to the feasible length of a block, whereas, from the most important standpoint of safety, too short a block cannot be used. Since the mere indication that a block is occupied does not show where, within the block, the occupying train is located, the signals presented to the following train must make allowance for the possibility that the detected preceding train is at a standstill and barely across the block boundary. Therefore, each block must be long enough so that, when a train is just barely within a block, a following train can be stopped within the length of the preceding block, which is referred to as the "approach" block. In fact, when a train is operated within the approach block, the train operator must be prepared to stop short of the next signal if the latter displays a "stop" aspect. Unfortunately, the familiarity of train operators with approach indications due to a preceding train about to leave the next block ahead, or the erroneous presumption that the train ahead will continue to move at normal speed within the occupied block, has led, with tragic results, to cases of "running the yellow," that is, the failure to reduce speed sufficiently when confronted by a caution signal or indication so as to make it possible to obey a subsequent "stop" indication. Although the resulting accidents are not the fault of the signaling system, but rather instances of human failure, the increased complexity and cost of the relay installation required to provide additional safety margins still do not remove the uncertaintly existing as to the identity, position and performance of a train within the limits of a block, and it is this uncertainty which makes possible the human failure.

Improved communication techniques and equipment make possible the economically feasible collection and centralization of information and the return transmission of instructions, and have led to the development of centralized traffic control as a supplement to the succession of localized relay centers constituting the existing automatic block signalling systems. Such centralized traffic control adds manual advisory control of signal indications from a centralized dispatching point to the local control of the individual signals. As in the existing automatic signalling systems, centralized traffic control presents signal indications to the train operator. The nature of the signal presented to the train operator is derived from analysis, by the dispatcher, of more information than is available to a restricted local relay installation in a conventional automatic block signalling system, but such information is still in the same basic form as the data provided by the older and simpler automatic signalling signals, that is, dependent upon the occupancy and non-occupancy of blocks represented by predetermined lengths of the track.

From the foregoing, it will be seen that automatic block signalling systems, and all other systems employing the blocks as a basic control factor, as presently used, do not provide the operator of a following train or the personnel at a centralized dispatching station with the identity or the operating condition of the train occupying any block, while the accuracy with which the location of the train can be determined is an inverse function of the block length.

Accordingly, it is an object of the invention to provide an automatic signalling and train control system for railroads which makes possible the most efficient utilization of the track by safely permitting the operation of successive trains with a minimum headway therebetween.

Another object is to provide an automatic signalling and train control system which frequently supplies information to a central control office or station concerning the identity, actual location and performance of each train along the track, and which makes use of such frequently received accurate information to present signal indications to the trains corresponding to the conditions for safe operation with a minimum headway between the trains, thereby to obtain maximum utilization of the track while improving the safety factor of operation.

In accordance with an aspect of this invention, the trains are provided with discrete signal generators effective to produce an electric pulse for each increment of distance travelled by the related train so that the sum of the pulses produced by a particular train will indicate the total distance travelled by the latter from the point at which operation was commenced. The indications of the distances travelled by all of the trains are frequently transmitted to a central office or station where such indications are rapidly analyzed and, as a result of the analysis, signal indications are transmitted back to the trains to control the operation of the latter in accordance with a predetermined program, for example, to achieve the maintenance of a minimum safe operating headway therebetween.

In a preferred embodiment of the invention, the discrete signals corresponding to increments of distance travelled are produced by a generator driven by the axle or wheels of the train, for example, to produce an electric pulse for each complete revolution of the wheel, and each train is preferably provided with generators driven by axles at the front and back ends thereof so that, in the event of the separation of the cars of the train, the discrete signal generator at the back end of the train becomes inoperative and thereby indicates this situation to the central office, and thereby controls the following trains accordingly.

In accordance with a further aspect of the invention, means are provided for periodically calibrating the indication of the total distance travelled, represented by the sum of the discrete signals generated in response to rotation of the train wheels, as against the actual distance travelled, and to compensate for any errors between the indication of the total distance travelled and the actual distance travelled, for example, by reason of wheel slippage or wheel-diameter variation.

A further object of the invention is to provide a system whereby the operation of a plurality of trains is automatically controlled from a central station in response to current information transmitted or reported to that central station from the plurality of trains indicating the exact positions along the track currently occupied by the trains and conditions of operation of the latter, thereby to permit full automation of railroad operation.

A still further object is to provide a system of the described character which operates in a serial cause and effect manner, so that the failure of any component of the system causes failure of the entire operating cycle which is detected in the central station or office and aboard the train to facilitate and assure fail-safe operation.

The above, and other objects, features and advantages of the invention will be apparent in the following detailed description of an illustrative embodiment thereof which is to be read in connection with the accompanying drawings forming a part hereof, and wherein.

Figure 1:
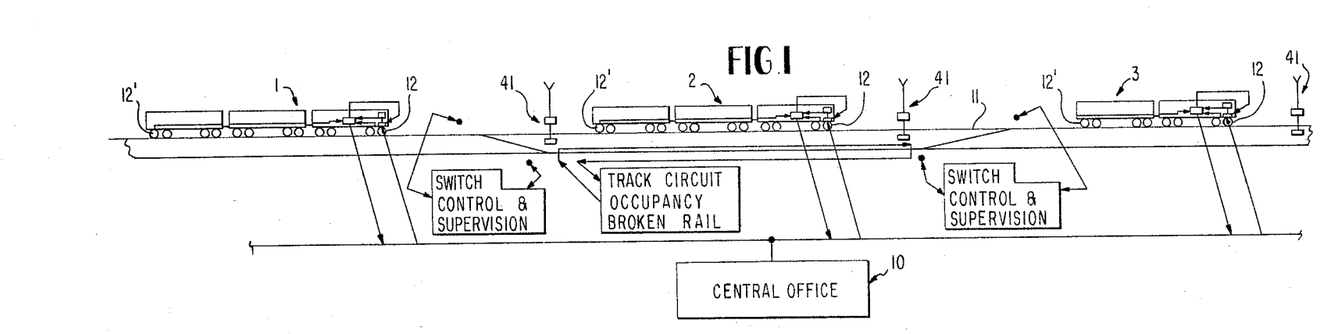
FIG. 1 is a schematic block diagram of an automatic coordinated signalling and operating system for railroads in accordance with the present invention.

Referring to the drawings in detail, and initially to FIG. 1 thereof, it will be seen that an automatic signalling and train control system embodying the present invention includes a central office or station indicated generally at 10, which receives detailed and accurate information concerning the location and operating condition of each of the trains, indicated generally by the reference numerals 1, 2 and 3, operating over the system of tracks 11. At the central office is located equipment for analyzing such information and correspondingly controlling the operation of the several trains so as to maintain a minimum safe operating headway therebetween, or to cause operation of the trains in accordance with any other predetermined program.

Each of the trains includes means for generating discrete signals in response to the movement of the train along the track, with each signal corresponding to a specific distance travelled so that, at any time following the commencement of operation of a particular train, the sum of the discrete signals generated in response to the movement thereof indicates the total distance travelled by the train. Since the starting points and times of the trains are known, it is possible to analyze the indications of the distances travelled by the several trains and determine the relative positions thereof along the track.

Figure 2:
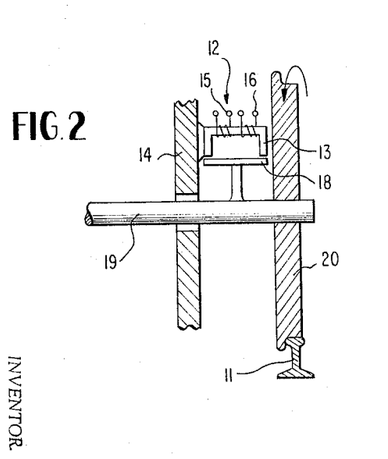
FIG. 2 is an axial sectional view of a train wheel showing a pulse generator associated therewith.

Each discrete signal generator can be any one of several types available, for example, a variable reluctance type, as shown in FIG. 2, and its purpose is to generate a fixed number of discrete signals for each revolution of an associated axle of the train. The discrete signal generator illustrated in FIG. 2, and there generally identified by the reference numeral 12, includes a generally U-shaped iron core 13 mounted at a fixed position on the truck 14 and having a primary winding 15 and a secondary winding 16. The primary winding 15 is continuously energized from an alternating current source, for example, from a one thousand cycle per second audio oscillator 17 (FIG. 4), and a soft iron bar 18 is suitably attached to the axle 19 adjacent core 13 so that, during each revolution of the axle 19 with the wheel 20 in response to movement of the related train along the track 11, the bar 18 comes into a position spanning the ends of the U-shaped core, as in FIG. 2, and completes the magnetic circuit, in order to cause a greater voltage to be induced in the secondary winding 16. Thus, a voltage sufficient to trigger the multivibrator is induced in the secondary winding 16 whenever the train has moved a distance along the track equal to the circumference of the wheel 20.

In the system embodying the present invention, each train is preferably provided with at least two discrete signal generators, indicated at 12 and 12', respectively, which are associated with the front and rear axles of the train so that the continued generation of signals by both the front and rear generators will indicate that the train is intact, whereas the absence of a signal from the rear generator 12', while the front generator 12 continues to operate, will indicate the fact that the cars of the train have separated.

Figure 3:
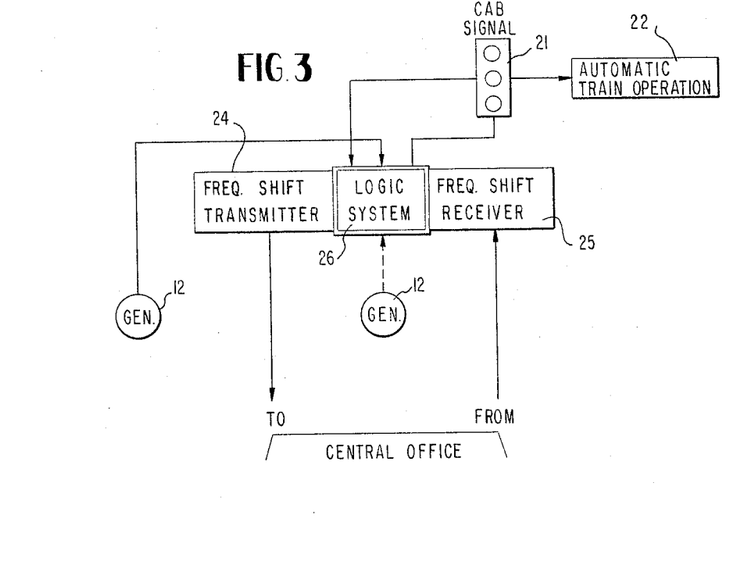
FIG. 3 is a block diagram illustrating the equipment carried by each train under the control of the system embodying the invention.

As shown in FIG. 3, the permanent equipment provided in each train further includes a conventional cab signal display 21 mounted in the engineer's cab and an automatic train control 22, for example, a common relay bank receiving the binary coded instructions for automatic operation from the central office 10, as hereinafter described in detail, and effective to translate those instructions into the appropriate pattern of contact closures for actuating the control apparatus of the train, that is, the power application controller, brakes and the like.

Cab signal display 21 is composed of signal lights selectively energized by a suitable source of electric energy upon closure of relay contacts, the appropriate relay being energized by a voltage derived from a register 32 to be later described with reference to FIG. 4. For example, red, yellow and green lights may be used for cab signal display. Automatic train operation relay bank 22 consists of a group of relays, the contacts of which parallel the contacts of a standard train controller, so that when the relays are appropriately energized from the register 32, their contacts will cause braking, coasting or acceleration in the same manner that a motorman would accomplish the same by setting the operating handle of a manual controller. A standard train controller such as referred to immediately above is described in Westinghouse publication entitled "Westinghouse Cam Control for New York City Transit Authority" dated May 1959. The portion of the control system whose electrical switching function the relay bank will duplicate is called the "master controller" and is shown schematically in FIG. 1 of the publication. Relay bank 22 thus translates the information in the register 32 into contact closures to accomplish the intent of the information in the instruction part of the register.

The other components provided on each train in accordance with the present invention comprise a frequency shift transmitter 24, that is, a device used to generate several distinct tones to be used in representing a binary number which is a coded number using only ones and zeros, a frequency shift receiver 25, and a logic system 26, to be more fully described hereinafter.

Figure 4:
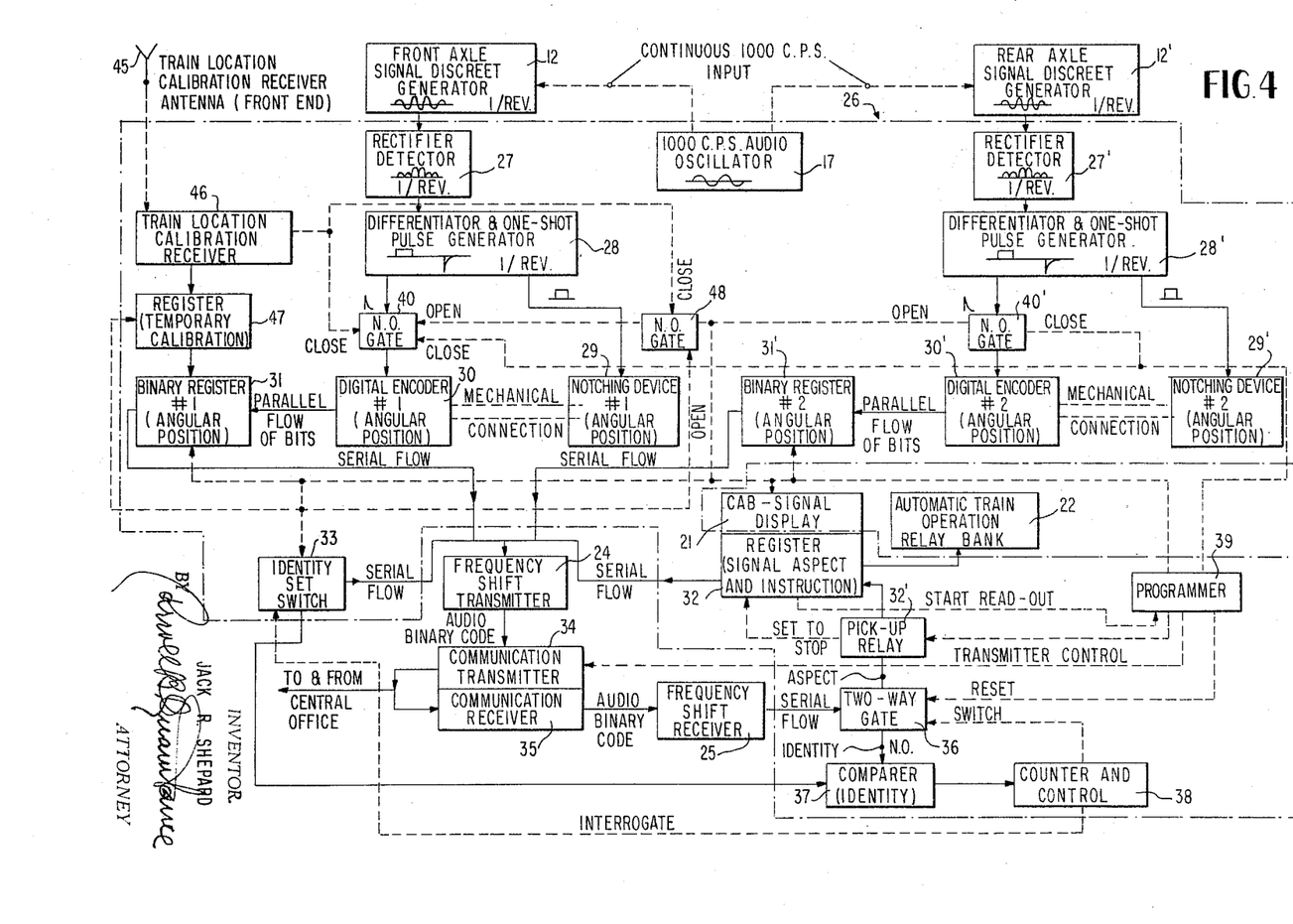
FIG. 4 is a block diagram showing additional details of the equipment carried by each train.

As shown in FIG. 4, each of the discrete signal generators 12 and 12' actually produces an irregular alternating current envelope, and this envelope is fed from each generator to a rectifier 27 or 27' where it is rectified into an irregular D.C. wave form which is further shaped into a rectangular D.C. pulse in a filter and one-shot pulse generator 28 or 28'. Each filter and one-shot pulse generator 28, 28' consists of a resistance-capacitance filtering circuit to smooth the half-wave rectified D.C. resulting from the rectifier detector 27 or 27', a monostable multivibrator, a typical example of which is shown on page 175, Pulse and Digital Circuits, by Millman & Taub, pub. 1956 by McGraw-Hill Book Company, (hereinafter referred to as M & T), and a differentiator circuit. If, for example, the multivibrator has a time constant of approximately 1/40 of a second, it applies a positive D.C. pulse during that time to the angular position notching device 29 or 29' in order to step this notching device forward one position. Upon return of the multivibrator to its stable state, the falling voltage is applied to a differentiator circuit (p. 4–59, Industrial Electronics Handbook, pub. 1958, McGraw-Hill, hereinafter referred to as I.E.H.), the output of which is a voltage spike which passes through a normally open gate 40 or 40' to interrogate digital encoders 30, 30'. The voltage spike output from the differentiators 28, 28' caused by the rising voltage of the multivibrator will be blocked by a conventional diode.

The angular position digital encoders 30 and 30' are each interrogated by this second pulse, which is triggered by the square wave and is received through a normally open gate 40 or 40' from the related differentiator circuit and one-shot pulse generator 28 or 28', so that, so long as the gates 40 and 40' are in their normally open positions, the encoders 30 and 30' are interrogated during each revolution of the train wheels to cause parallel flows of binary information from the encoders to the related angular position binary registers 31 and 31'. When the gates 40 and 40' are closed, the encoders 30 and 30' still keep a current record of the wheel revolutions, even though the delivery of the record of information to the registers 31 and 31' is inhibited by the closed gates which bar the interrogating pulses.

As previously mentioned, the rectangular D.C. pulses from the generators 28 and 28' are fed to related notching devices 29 and 29' which are in the form of notching motors or stepping switches, one suitable example being shown in U.S. Patent 2,284,816 to Harrington et al., to record the number of revolutions made by the axles associated with the discrete signal generators 12 and 12' in terms of angular degrees of revolution of the notching motors or stepping switches. The notching devices 29 and 29' actuate related digital encoders 30 and 30', respectively, which convert the angular positions of the shafts of the notching devices 29 and 29' into corresponding binary information, and such information is adapted to be fed to binary registers 31 and 31' which maintain a memory or record of the binary coded number most recently fed thereto from the related encoder 30 or 30'. The digital encoder 30 or 30' may be a device such as the Digital Converter shown in U.S. Patent 2,733,008 to Andrea et al., which would have an input shaft connectable to the hub of the drive shaft of the Harrington et al. (supra) rotary switch. A series of contact arms actuated by the input shaft via a gear train are appropriately disposed so as to accomplish contact closures that are different for each angular position of the encoder. Thus, when each digital encoder 30 or 30' is energized or interrogated through gate 40 or 40', a pattern of electric signals is emitted from its output terminals to form a code which is unique for each angular position of the disc, and which represents the number of wheel revolutions that have been accumulated. Other shaft position digital encoders usable for this purpose are: Model No. ADC–STIO–BNRY, manufactured by Norden Division, United Aircraft Corporation; and Librascope Shaft Position-To-Digital Encoder (Librascope Bulletin No. E 11–1).

Binary register 31 or 31' is an electronic register composed of flip-flop circuits which are each some form of bi-stable multivibrator, arranged so that when each flip-flop is placed in one or the other of its unique states, the states of the flip-flops represent a code in terms of ones or zeros, wherein one state of the flip-flop represents zero, and the other state, one. These flip-flops can all be set by applying either positive or negative electric impulses to their inputs in one pulse time (I.E.H. p. 4–72; 4–73). The register, depending on its form, can then be scanned one position at a time to read out the word it contains or, if a shift register is used, shift pulses can be fed into its shift input causing the output of the last flip-flop stage to assume the state of all flip-flops preceding it in turn, thus reading out the information in the register serially. (M & T, pages 411–415.) The register 31 or 31' maintains a memory or record of the binary coded number most recently fed thereto from the related encoder 30 or 31', because when the register flip-flops are set to a particular state by the digital encoder 30 or 30', each register flip-flop remains in that state until changed by being set again the next time the digital encoder 30 or 30' is interrogated by the pulse through gate 40 or 40' from pulse generator 28 or 28'. While minor differences are necessary to adapt the various registers throughout the system to the particular uses for which they are intended, the basic laws of operation of registers 31 or 31' apply to registers 47, 32, 60, 62, 64 and 69 (FIGS. 4 and 7) all of whose functions are detailed hereinafter.

The frequency shift transmitter 24 is adapted to receive the binary information from the registers 31 and 31', and further receives binary coded numbers constituting signal aspect information from the register 32 which is operatively associated with the cab signal display 21 and the automatic train operation relay bank 22 to produce binary coded numbers or information corresponding to the conditions of the cab signal display and the train controls. A typical frequency shift transmitter for the subject system would consist of three oscillators oscillating at three different frequencies, F1, F2 and F3. F1 would be utilized to monitor the channel and provide spaces between bits of information to be transmitted. The three oscillators would be connected to three electronic gates (p. 4–53, I.E.H.), the gate for F1 being normally open and the other two normally closed, F2 being a higher frequency than F1, and F3 being a lower frequency than F1. In a message to be transmitted, F2 represents a one, F3 represents a zero, and F1 indicates a space between bits. Thus, if the binary number, one-zero-one is to be transmitted, F1 is gated off and F2 gated on; then F2 is gated off and F1 gated on; then F1 is gated off and F3 gated on; then F3 is gated off and F1 gated on; then F1 is gated off and F2 on; and then F2 is gated off and F1 on. The frequency being transmitted therefore is shifted from F1 to F2 to represent one; back to F1 to represent a space; then to F3 to represent a zero; then F1 to represent a space, then to F2 to represent a one; and then to F1 to represent a space or the end of the message. Typical frequency shift tone transmitters and receivers usable for these purposes are "Tele-signal" Model 101:102, manufactured by General Precision Laboratory, Inc. Other examples are shown in the patents to Robin 2,833,857 and Moynihan 2,677,014. Although four input lines to the frequency shift transmitter 24 are shown, it will be apparent to one skilled in the art that they are energized serially one at a time, and might be represented by one input lead connected to four sources. An identity set switch 33 containing or holding predetermined binary information identifying the particular train on which the equipment is located is also connected to the frequency shift transmitter 24 to feed such information to the latter when interrogated by the report sequencer 39, and the output of the frequency shift transmitter is used to modulate a communication transmitter 34.

Register 32 is an electronic register similar to register 31 or 31'. Information is loaded into this register through a time delay dropout relay 32' by reading a bit (a one or a zero, or positively or relatively negative electric signal) into the first flip-flop of the register, and then introducing a shift pulse which shifts that bit from the first to the second flip-flop, then entering another bit into the first flip-flop, and then a shift pulse, thus shifting both bits over one position, and so on until all the bits have been loaded into the register, at which time the incoming code is left standing in the register in terms of states of the flip-flops composing the register (M & T, pages 412, 425, 426). Although solid-state circuitry may be used, circuits utilizing vacuum tubes are preferred in the illustrated embodiment. Each flip-flop, being composed of a bi-stable multivibrator, exhibits a high or low plate voltage on one of the tubes of the flip-flop, depending on the state of the flip-flop. The plate voltage is then utilized to energize (if the plate voltage be high) or not energize (if it be low) a relay in the cab signal display 21. One relay is used for each of the flip-flops associated with the cab signal. The contacts of the relays are so arranged that, depending on the code reported by the state of the flip-flops, the appropriate light in the display is energized. Similarly, a group of relays, each of which is associated with a particular flip-flop in the portion of the register 32 containing the automatic train operation instruction, are energized, or not energized, individually, such that their contacts provide a current path to take the place of the current path that would be provided if a train operator set the train controller to the position indicated by the code in the instruction portion of register 32. When the signal aspect and instruction is read serially from the register 32 to the frequency shift transmitter 24, this function is accomplished by scanning the register or, in other words, looking at the plate voltage of one of the tubes of each flip-flop in turn. This function is accomplished by a programmer 39 which includes a scanner for this purpose.

The function of the time delay drop-out relay 32', through which signals are provided to the register 32 signal aspect and instruction, is to provide a fail-safe feature. The relay is so arranged that it must be energized periodically by means of a signal from the programmer 39 to maintain the relay in picked-up state. When the relay is in picked-up state, front contacts allow register 32 to be loaded with signal aspect and instruction data through two-way gate 36 with whatever signal is to be transmitted to the train. If the relay is allowed to drop out, by failure to cycle the programmer 39 and thereby failing to periodically energize the relay, the front contacts open to prevent loading register 32 with signal aspect and instruction data and back contacts close to force a "stop" aspect and instruction to stand in register 32, thus displaying a "stop" signal on display 21 and setting the automatic train relay bank 22 to a stop mode to stop the train. The time delay to drop out of the relay 32' is provided so that momentary interruptions in the sequence of system operation do not stop the train. The time delay may be adjusted, of course, to fit the particular operating conditions of individual railroads.

A typical identity set switch 33 would be a set of electrical contacts individually set to be closed or open; for example, if the identity of the train is to be represented by a 7-bit binary number, seven contacts would be provided. Each contact would be closed or open and left that way in order to represent the identity of the train in terms of ones and zeros, wherein a closed contact would represent a one and an open contact would represent a zero.

When the identity of the train of the train is to be transmitted to the central office via the frequency shift transmitter 24, the programmer 39, which contains a scanner which will be described more fully later, scans each contact in turn and if the contact is closed, the frequency shift transmitter sends frequency F2. If the contact is open, the frequency shift transmitter 24 sends F3. Thus, scanning the contacts results in transmission of a frequency shift code that represents the identity of the train which has been manually set in the contacts.

Figure 5:
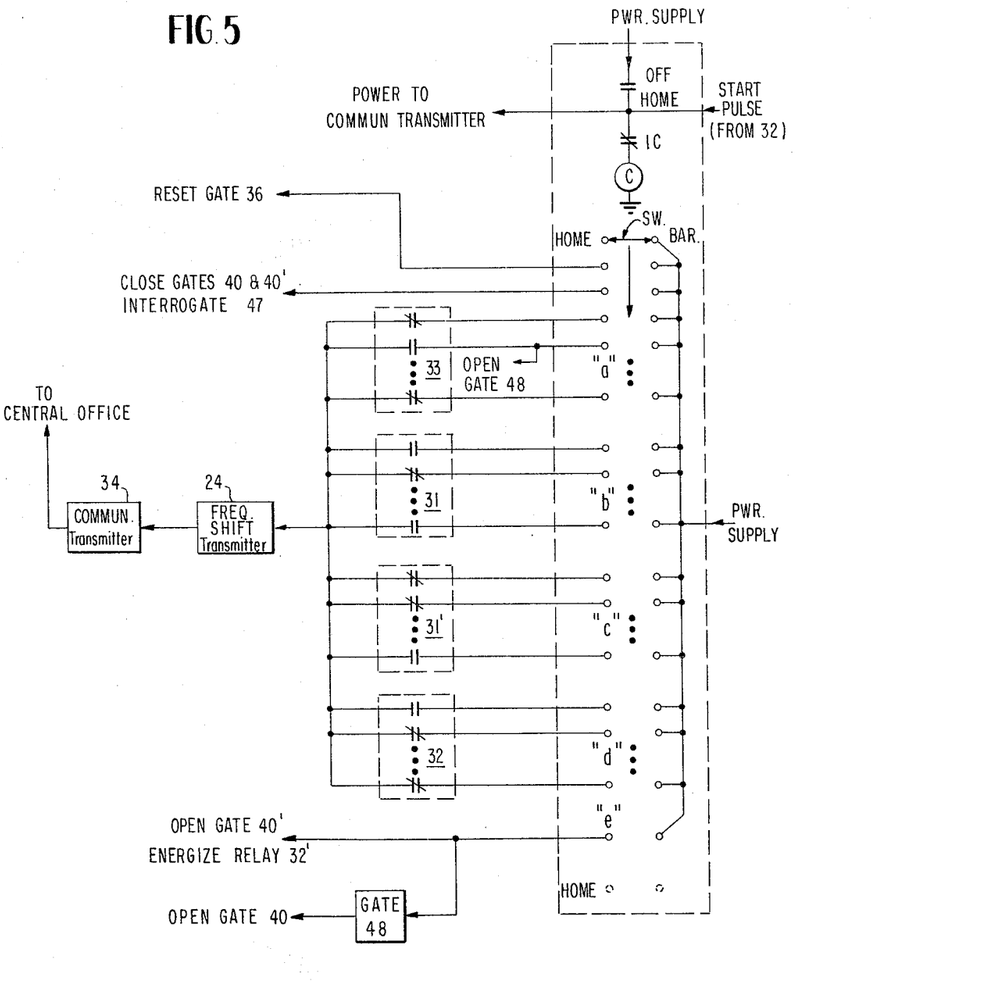
FIG. 5 is a diagram illustrating in simplified form, a typical programmer shown in FIG. 4.

FIGURE 5 diagrammatically illustrates, in simplified form, the fundamental operation of the programmer 39 which serves as a report sequencer. In accordance with standard practice, the programmer would be an electronic device, whose basic functions are comparable to a stepping switch of the type shown in the patent to Nelson et al. 2,171,044. For illustration the device, as diagrammed, would consist of an operation coil C and interrupting contact IC, an "off home" contact I.O., a source of power to operate communications transmitter, and a series of normally open interrogate and control contacts. The switch bar would be in the "home" position when the programmer is inactive. A start pulse from the register 32 energizes the coil C to step the switch bar from the "home" position to the first position to reset two-way gate 36. Any time the switch bar is not in the "home" position the "off home" contact I.O. is closed. Therefore, power would be supplied to the communication transmitter 34 for keying and control. Energizing coil C by the start pulse from 32 through the IC contact steps the switch bar from the "home" position to the first contact as stated, and in so doing, opens contact IC, which allows the stepping mechanism to recock which closes contact IC wherein the coil C is again energized, but now through the "off home" contact instead of from register 32, thus stepping the switch bar to the next contact position wherein I.C. again opens, and so on. The switch bar thus steps from contact to contact around the bank of the switch to the "home" position shown at the bottom of the device. This position is, in reality, the same "home" position as at the top, the switch bar having made a complete cycle around the circularly oriented bank of contacts.

Thus, a single start pulse from 32 causes the switch bar subsequently to step from contact to contact around the bank and back to "home." The first contact, as was previously mentioned, resets two-way gate 36, the second closes gates 40 and 40' and interrogates register 47 to transfer the information in register 47 to register 31. The next series of positions, designated "a," sequentially interrogates the digital positions of the identity set switch 33 and opens gate 48. The pattern of contact closures in 33 establishes a binary digital number to identify the train. This pattern is set manually.

The next series of contacts is designated "b," and is used to interrogate, sequentially, the digital positions of register 31. There, as in registers 31' and 32, relays for three-bit numbers are illustrated for purposes of simplification, it being understood that relays with more contacts would normally be used. The digital position of register 31 are shown as contacts, but might be any type of binary devices to form a register.

The groups "c" and "d" are similar in nature and are used to interrogate registers 31' and 32. Output "e" is used to energize the time delay relay 32' through which signals are sent to the register 32, to open the gate 40', and, if the gate 48 permits, to open the gate 40.

Thus, it can be seen that the programmer 39 provides power sequentially to its various outputs which are, in turn, connected to gate 36, relay 32', gates 40 and 40', registers 31, 31', 32 and identity set switch 33. The output side of the devices 31, 31', 32 and 33 are connected together and, in turn, connected to the input of the frequency shift transmitter 24, arranged to produce three audio tones F1, F2, F3, respectively representing space, one and zero. Frequency shift transmitter 24 gets a pulse code input consisting of pulse trains "a" through "d," and these pulses are to consist of 1's or 0's, depending upon the pattern established by the contacts of identity set switch 33 and registers 31, 31' and 32. Frequency shift transmitter 24 acts to translate the pulse code to an audio tone code which can be used to modulate a standard communication transmitter 34.

Referring further to FIG. 4, it will be seen that the frequency shift receiver 25 located on the train receives an audio frequency binary code from a communication receiver 35. The communication transmitter 34 and the communication receiver 35 respectively transmit and receive binary coded information to and from the central office 10. The communication receiver 35 is complementary to the communication transmitter 34 and is utilized to receive the radio signals from the Central Office carrying the three frequencies of the frequency shift transmitter 51 in the Central Office, and to deliver these audio tones to the frequency shift receiver 25, all for the purpose of digital communication from the Central Office to the train.

The binary information transmitted by communication transmitter 34 is in several parts, namely, an initial portion determined by the identity set switch 33 which serves to identify the particular train, a portion corresponding to the conditions of the cab signal display 21 and train controls 22, as fed to the frequency shift transmitter by way of the register 32, and portions corresponding to the identity of a particular location or station just passed by the train and received by train location calibration receiver 46 and register 47 and subsequently delivered to register 31, and to the distances travelled by the front and rear wheels of the train, as fed to the frequency shift transmitter through the angular position binary registers 31 and 31'. Communication transmitter 34 and communication receiver 35 operate as a communications transceiver in the standard manner, such that the communications receiver is on standby and receives any radio signal arriving at its antenna that coincides with its carrier frequency. It delivers the audio signal modulated on its carrier to the frequency shift receiver 25 which translates the frequency shift tone digital data to D.C. pulse digital data, which is utilized by the comparer as described herein. The communication transmitter is keyed by the appropriate program steps in the programmer 39 and is modulated by the three tone frequencies delivered to its audio input by the frequency shift transmitter 24.

Similarly, the communication receiver 35 receives, from the central office 10, binary coded information formed of several portions which respectively represent the identity of the train, the signal aspect that should be displayed by the cab signal display 21, and the control conditions that should be established by the automatic train operation relay bank 22.

The frequency shift receiver 25 is connected to a two-way gate 36 receiving the D.C. pulse code from the frequency shift receiver and being normally open in the direction toward a comparer 37, which can be a single half-adder. The two-way gate 36 consists of two gates, one of which is between frequency shift receiver 25 and the register 32 and is normally closed. The other is between frequency shift receiver 25 and the comparer 37 and is normally open. These gates are used to pass D.C. pulse digital data when open and to bar the passage of such data when closed. These gates are similar to other gates described herein, all of which vary only in that they are either normally open or normally closed. A gate of this type may consist of a biased diode, where the bias is supplied by one or the other halves of a bistable multivibrator. Thus, if the multivibrator is set to one state, and in this state the plate voltage is used to bias the diode "on," then if the multivibrator is set to the other state the plate voltage will bias the diode "off." The multivibrators have two inputs, one to the grid of each of two tubes. (p. 140, 142, M & T.) A positive signal input to one grid will cause that tube to conduct, which will cut off the other tube, and the multivibrator will remain in the state where the first tube is conducting and the second is not conducting. A positive signal input to the grid of the second tube causes the second tube to conduct and the first to cut off. The multivibrator will then remain in this state. Thus, the two-way gate 36 allows the D.C. digital data to flow from frequency shift receiver 25 to the comparer 37 until the counter and control 38 provides a signal to the two multivibrators to cut off the diode in the gate to the comparer 37 and turn on a diode in the gate to the register 32.

The comparer 37 is a single half-adder. (p. 9 "Language & Symbology of Digital Computer System.") The identity number from identity switch 33 and the identity number being received from frequency shift receiver 25 are compared in the half-adder (comparer 37) by adding the two numbers together, bit by bit. It can be seen that if two ones are added together, or if two zeros are added together, the output from the half-adder is zero. If a one and a zero, or a zero and a one are added together, the output is one. Therefore, if the identity number from the set-switch 33 and the identity number being received from frequency shift receiver 25 are equal, bit for bit, no "one" output will occur from the half-adder for any digit of the numbers. This half-adder is therefore being used as an equivalency circuit.

The comparer 37 is also suitably connected to the identity set switch 33 and to a counter and control unit 38 which is effective to interrogate the identity set switch and to actuate the gate 36 so as to open the latter toward the register 32 only when the comparer 37 senses that the initial portion of the binary coded information received by the communication receiver 35 and identifying the particular train for which information is intended corresponds to the binary coded information delivered by the identity set switch 33.

The counter and control unit 38 is an electronic binary digital counter (M & T, p. 323) that interrogates identity set switch 33 and keeps track of the number of bits being compared, such that, when the entire identity numbers have been compared, the control causes the two gates in two-way gate 36 to transfer the instruction information received through frequency shift receiver 25 to register 32. Thus, the identity portion of the message being received from the frequency shift receiver 25 is taken through the comparer to confirm that the message was intended for this particular train, and if equivalency is detected, the remainder of the message is sent to the register 32 where it is stored in this register for future use. The counter and control 38 includes a flip-flop circuit that is set normally in one state, and if a signal is received from the comparer it is set to the other state, which state is utilized to close the gate in two-way gate 36 to the comparer, but not open the two-way gate in gate 36 to register 32. Thus, if equivalency between identity numbers is not detected, the remainder of the message is rejected.

When the counter and control unit 38 switches the two-way gate 36, as previously indicated, the remainder of the received binary coded information is fed to the register 32 to correspondingly control the cab signal display 21 and the automatic train operation relay bank 22. The register 32 is further connected to programmer 39 and sends a start-pulse to the latter after completing the actuation of the cab signal display 21 and relay bank 22.

The programmer is started from the register 32 in the following manner: When the message being received from frequency shift receiver 25 is loaded serially into register 32 (Ref.: Millman & Taub, pp. 412, 425), the number of shift pulses are counted by an auxiliary binary counter, and when all of the bits of the message (always consisting of the same number of bits) have been received, a flip-flop in the counter changes its state and the voltage output of one of the tubes of the flip-flop is then used to send a start pulse to the programmer 39.

The programmer 39 controls the sequence of reports, i.e., the order in which binary information is fed to the frequency shift transmitter 24 for communication to the central office 10 by way of the communication transmitter 34. The programmer 39 has fundamental operation as previously described and illustrated in simplified form in FIG. 5. The function of the programmer 39 is similar to that of a switch bar arranged to run through its stepping sequence automatically, and which scans the contacts of identity set-switch 33 to provide a pulse or no-pulse to the comparer 37 and to frequency shift transmitter 24, depending on whether the contacts of 33 are open or closed. The counter counts the number of clock pulses that occur, to and including e, which is utilized to open gate 40, at which time the counter re-sets and is ready to step through the next report sequence. Thus, the programmer, when energized by a start-pulse from the register 32, initially causes energization of the communication transmitter 34 and also resets the two-way gate 36. The keying of transmitter 34 and the resetting of two-way gate 36 is accomplished by the delivery of a pulse from programmer 39 through a diode switching matrix which causes the respective pulses to occur at the proper point and time.

Since there may be some variation in the diameter of the wheel 20 on the axle 19 associated with the discrete signal generator 12 or 12', and since there may be some slippage between the wheel 20 and the track 11, the system embodying the invention further includes means for calibrating the indication of the distance travelled by the train as a function of the revolutions of the wheels thereof. As indicated in FIG. 1, calibration transmitter devices, which are generally identified by the reference numerals 41, are disposed alongside the track 11 at suitable, properly spaced apart locations. Each calibration transmitter device 41 (FIG. 8) may include a calibration transmitter 42 having an antenna 43 operative to transmit an identifying binary coded signal when a control switch 44 is actuated by a wheel flange of a passing train. The identifying binary coded signal from the antenna 43 of calibration transmitter 42 is received by an antenna 45 located at the front end of the train and suitably coupled to a train location calibration receiver 46. Inasmuch as it is desired to provide a signal to the receiver 46 only in response to the passing of the first wheel of the train over the switch 44, the transmitter 41 embodies means for de-energizing it for a predetermined length of time after it has been once energized to transmit a coded signal. That length of time may be relatively short to prevent transmitter actuation by succeeding wheels of the first truck. Since the signal provided by the transmitter is relatively weak, energization of the transmitter by other wheels of the train will have no effect because the receiving antenna 45 will be too far from the transmitting antenna 43 to receive the signal. Furthermore, the antennas 43 and 45 may take the form of coils which are inductively coupled to each other closely enough to transfer a signal only when the first wheel of the train passes over the switch 44.

Figure 8:
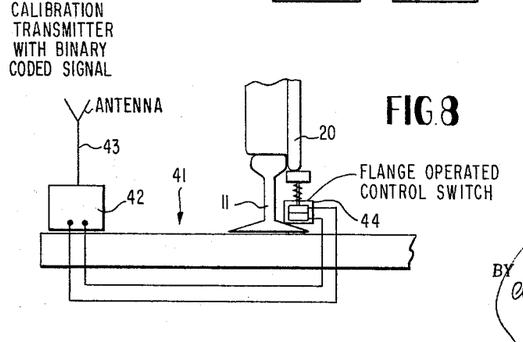
FIG. 8 is a detailed schematic view illustrating a calibration transmitter installed at suitably spaced apart locations along the track in the system embodying the invention; and, FIGS. 9A and 9B comprise a logic diagram for the computer at the central station.

The binary coded signal, which identifies the calibration transmitter device 41 then being passed by the train, is fed to a register 47 in which is stored data representing temporary calibration of the train's position, in which said data is temporarily stored for subsequent feeding to the register 31. Register 47 is an electronic binary digital register composed of a flip-flop for each bit. The information is read into this register serially from calibration receiver 46 and is read out in parallel, or gated out, to binary register 31.

A normally open gate 48 is interposed in a connection between programmer 39 and the normally open gate 40. The normally open gatae 48 is a biased diode wherein the bias is provided by one of the two plate outputs of a bistable multivibrator flip-flop. When the flip-flop is in the state wherein the gate or the diode is biased on, the gate is open and will pass the digital pulse. When the flip-flop is in the state wherein the diode is biased off, the gate is closed and will not pass the information. The flip-flop can be set in either position by providing a positive pulse to the grid of the appropriate tube of the flip-flop, or bistable multivibrator to change its state.

The train location calibration receiver 46 emits a signal which is effective to close both the gate 40 and the gate 48 during the transmission of a binary coded number from receiver 46 through register 47 to the binary register 31 where such binary coded number identifying the train location calibration transmitter device passed by the train is stored along with the binary coded number or information previously received from the related encoder 30. Calibration receiver 46 closes gate 40 and gate 48 by providing a positive pulse, coincident with the first bit of information received from calibration transmitter 41, to the grid of the appropriate tube of the multivibrators in gates 40 and 48, thus switching the state of the multivibrator such that its plate output causes the biased diodes to clamp the circuit such that the gate is effectively closed (M & T, p. 392). These gates will remain closed until subsequently reopened by a pulse from the report sequencer applied to the grids of the opposite tubes of the multivibrators.

It will be seen that this last sequential function of programmer 39, that is, the opening of the previously closed gate 40, can be performed only if the gate 48 is then open. Since the train location calibration receiver 46 is effective to close both gates 40 and 48 whenever its antenna 45 receives a signal from a train location calibration transmitter, and since the first report sequence pulse train a of the programmer 39, which serves to interrogate the identity set switch also serves to open the gate 48, it will be apparent that, at the end of the reporting functions of the programmer 39, the pulse e of the latter can once again be effective to open the gate 40 to permit continued actuation of the encoder 30 by the pulses from generator 28.

Figure 6:
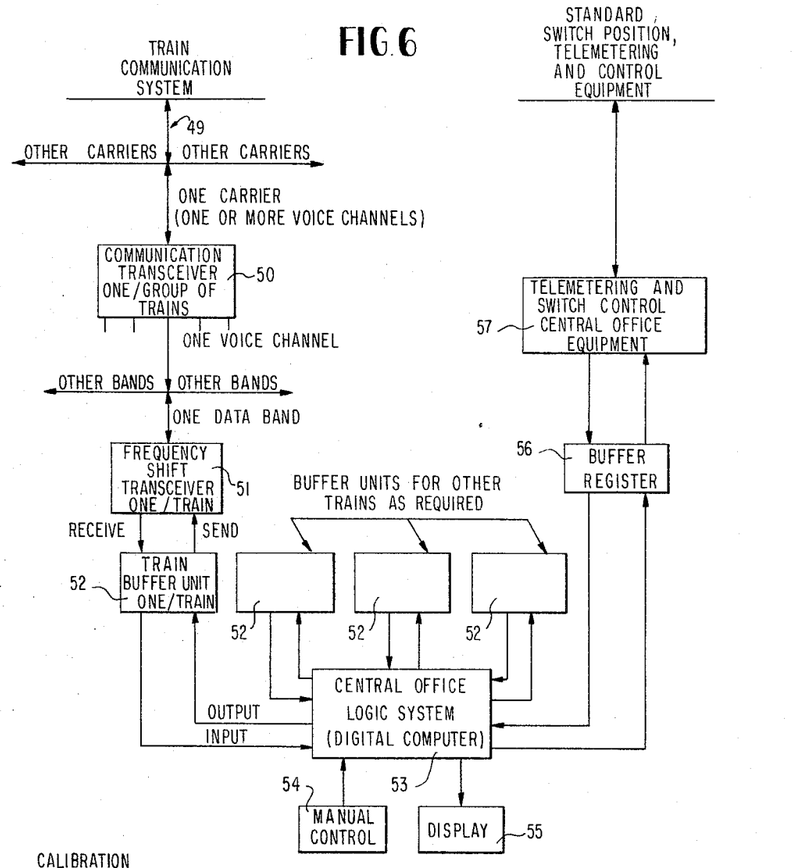
FIG. 6 is a block diagram showing additional details of the equipment provided at the central office or station in the system embodying the invention.

Referring now to FIG. 6, it will be seen that a logical arrangement of the equipment at the central office or station 10 may include a train communication system 49 which can consist of space radio or line carrier radio, known as inductive pick-up carrier communication. The system 49 is composed of several radio frequency carriers, each of which is received and transmitted by a communication transceiver 50 associated with a group of trains. The communication transceiver 50 includes a transmitter similar to communication transmitter 34 and a receiver similar to communication receiver 35. Each transceiver 50 and its carrier 49 has one or more voice channels multiplexed on the carrier frequency, while each voice channel is separated by suitable filters into data bands, for example, of approximately 200 cycles each, so that each band may carry data to and from a particular train. If there are fifteen bands in each voice channel, five voice channels for each carrier and ten carriers, the system would be capable of controlling the operation of 750 different trains.

Figure 7:
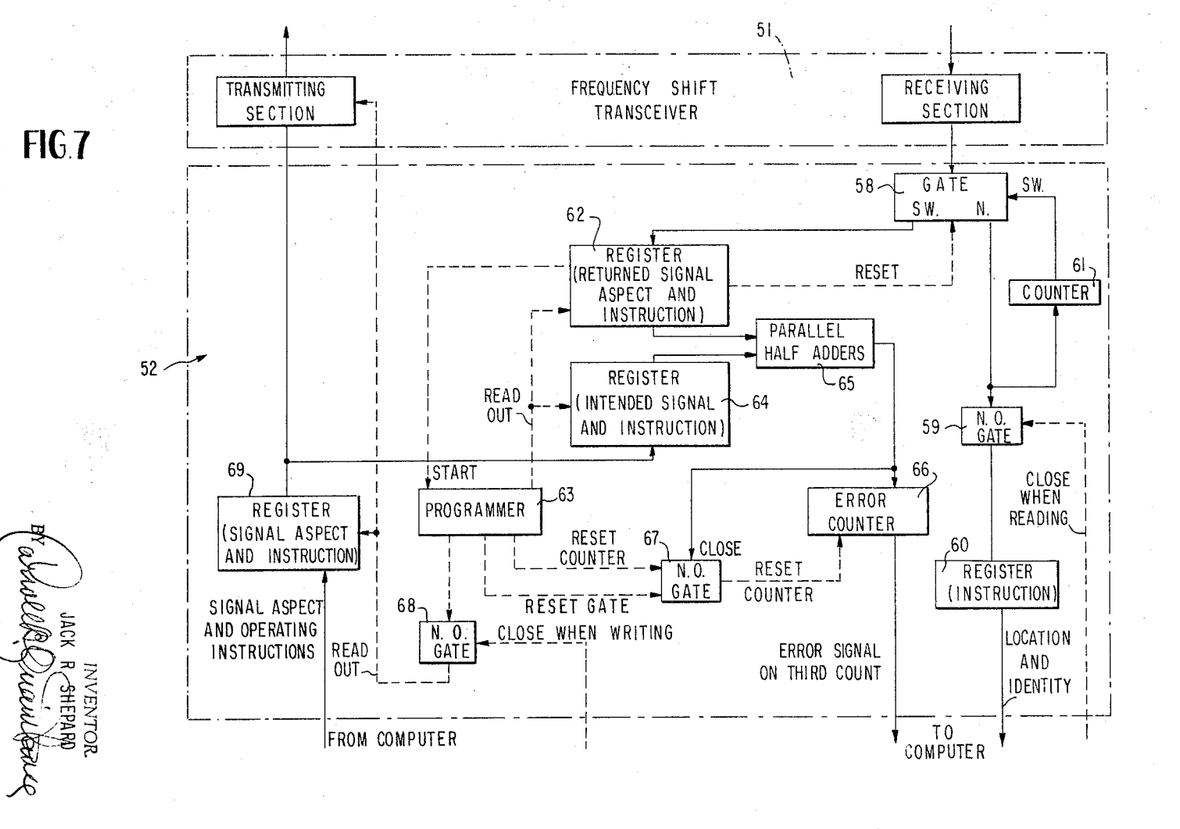
FIG. 7 is a block diagram showing the details of a buffer unit provided at the central office or station for each of the trains being controlled.

Each audio frequency data band corresponding to a particular train is received and transmitted by a corresponding frequency shift digital transceiver 51 having receiving and transmitting sections which deliver information to, and accept information from a related train buffer unit generally identified by the reference numeral 52, and illustrated in greater detail in FIG. 7, of the drawings. The frequency shift transceiver 51 consists of a frequency shift transmitter similar to 24 and a frequency shift receiver similar to 25. In any given voice channel, the particular frequencies F1, F2 and F3, utilized by the frequency shift transmitter and receiver, are selected from the voice channel by filtering.

The digital information received from, and transmitted to the trains, by way of the train buffer units 52, is all received by, and originates from, a central office logic system or high speed computer 53 which is further provided with a device 54, that is, an operating console, for manual operation and drives a visual display device 55 showing pertinent data concerning the operation of the controlled railroad. Typical computers that might be used are those known as the TRW–330 and TRW–340 manufactured by the Bunker-Ramo Corporation, Canuga Park, California.

Further, as shown in FIG. 6, the central office 10 includes an input-output buffer register 56 interposed between the computer 53 and the central office equipment 57 of standard switch position, telemetering and control equipment such as that manufactured by Westinghouse Electric Corporation and known as "Visicode" Supervisory Control or similar equipment manufactured by Noller Control Systems, Inc. or Moore Associates. The input-output buffer register 56 is an electronic binary shift register (M & T, p. 412–425) which is utilized to receive digital data from the telemetering equipment 57 at a slow clock rate in serial form and to subsequently deliver the information to the computer system 53 at a very high clock rate. Information is delivered from the computer 53 to the buffer register 56 at a high clock rate and subsequently shifted out in serial form to the telemetering equipment at a slow clock rate. The rail switch telemetering system is utilized to provide opening and closing of switches and indication of switch position together with any telemetering functions that may be required which are incidental to the concept of this invention.

Referring to FIG. 7, it will be seen that each buffer unit 52 provided at the central office 10 for a corresponding train includes a gate 58, similar to the gate 36, connected to the receiving section of the related frequency shift transceiver 51 and having a normal position and a switched position. The normal position of gate 58 is connected through a normally open gate 59 to a register 60 into which there is read the binary coded information corresponding to the identity of the train, the identity of the calibration transmitting device 41 passed by the train, and the apparent locations of both ends of the train. Normally open gate 59 is similar to normally open gate 68, referred to hereinafter, in that the computer holds this gate closed when reading information out of register 60. Register 60 is similar to signal aspect register 32 but is utilized to receive information from the train at a slow clock rate and deliver it to the computer at a high clock rate. A counter 61, similar to counter and control unit 38, is also connected to the normal position of gate 58 and counts the number of binary bits fed through the normal position of gate 58 from the receiving section of transceiver 51. The counter 61 is operative to switch gate 58 to its switched position upon the reception by the counter of a predetermined number of bits, that is, the number of bits corresponding to the identity of the train, the identity of the passed calibration transmitter and the apparent locations of the opposite ends of the train.

The switched position of gate 58 is connected to a register 62 (returned signal aspect and instruction) which receives the remainder of the binary coded information, that is, the binary coded information corresponding to the conditions of the cab signal display 21 and the automatic train operation relay bank 22 on the related train. Register 62 is similar to register 32, in that it is an electronic binary digital register wherein the received message through gate 58 is loaded into the register 62 serially where it stands (is stored) until programmer 63 delivers it to the parallel half adder 65 in parallel.

When the loading of the register 62 is completed, the latter transmits a start-pulse to a programmer 63 which is then effective to emit four signals in sequence which are identified as a, b, c, and d, respectively. Programmer 63 is similar to programmer 39. The outputs of the register 62 for the returned signal aspect and instruction and of register 64 for the intended signal aspect and instruction, identical to register 62, are connected to a parallel half adder 65. The parallel half adders 65 are a group of single half adders similar to the comparer 37 arranged to compare correlative bits from registers 62 and 64 simultaneously. The outputs of the single half adders 65 are connected together (in parallel) such that if all correlative bits from 62 and 64 are identical, no output results. If one or more correlative bits from the registers 62 and 64 are unequal an output results from half adders 65, thus an output from half adders 65 indicate non-equivalence between the contents of 62 and 64. This non-equivalence output is in the form of a D.C. pulse. Thus, the signal a from programmer 63 causes the contents of the registers 62 and 64 to be simultaneously read into the parallel half adders 65 in parallel form, that is, in the time required for a single pulse, and if there is any inequality between the contents of the registers 62 and 64, respectively, there is an output from the parallel half adders 65. An error counter 66 and a normally open gate 67 are connected to the parallel half adders 65, and such gate is closed upon the reception of an output from the parallel half adders indicating inequality between the read-out contents of the registers 62 and 64. An output from the parallel half adders 65 further advances the error counter 66 by one step. The normally open gate 67 is connected between the programmer 63 and the error counter 66, and the b signal from the programmer is directed to the gate 67 and passes through the latter to the error counter 66, when the gate 67 is open, in order to reset the counter 66. If an error has been detected and the resulting output of adders 65 caused closing of the gate 67, the second signal b is blocked at such gate, and resetting of the error counter does not then occur.

The error counter 66 is similar to the counter and control 38. After having counted to three, it produces a pulse to the computer input which is understood to mean that three errors have occurred and emergency precautions should be taken by the computer program. Normally open gate 67 is similar to normally open gate 48, and is closed by a non-equivalency pulse from the parallel half-adders 65, and is opened again by the re-set pulse from programmer 63.

The third signal c from programmer 63 is sent through a normally open gate 68 to the transmitting section of frequency shift transceiver 51 and to a register 69 which is connected to that transmitting section and receives the desired signal aspect and control instructions from the computer. Gate 68 is similar to gate 67, except that a monostable multivibrator is used to bias the diode instead of a bistable multivibrator such as is used in gates 67 and 48. The computer provides a D.C. voltage that holds the multivibrator in its non-stable state to close gate 68 during the period when the computer is shifting information into the register 69. Upon completion of this operation, the computer removes the voltage from the monostable multivibrator, which allows it to revert to its stable state, thus biasing the diode "on" again (re-opening the gate which has been held closed during the time the computer is supplying information to the instruction register 69—or writing). Register 69 is similar to register 60 and is used to receive the signal aspect, instruction and identity of the train from the computer, serially, at the high clock rate of the computer, and is subsequently used to shift this information out through the transmitting section of the frequency shift transceiver 51 at the lower transmission clock rate. The programmer 63 provides the shift pulses through normally open gate 68 to accomplish this function, and also keys the transmitting section of frequency shift transceiver 51, during the time the signal is being read out of 69 through the transmitting section of 51. When the gate 68 is in its normally open position, the signal c from programmer 63 is effective to initiate read-out of the register 69 and to operate the transmitting section of transceiver 51 by which binary coded information corresponding to the identity of the related train and to the desired conditions of the cab signal display 21 and automatic train operation relay bank 22 are transmitted to the related train.

The fourth signal *d* is fed from programmer 63 to the gate 67 and is effective to open or reset the latter if it has been previously closed by a detected error.

If an error has been detected during three successive operating cycles, the error counter 66 sends an error signal to the computer 53. However, if errors are detected in only one cycle or in two successive cycles, but the third operating cycle does not indicate an error, the normally open gate 67 is not closed by an output from the parallel half adder 65 during the emission of signal *a* in the third operating cycle, and the following second signal *b* from the programmer 63 then passes through the open gate 67 and resets the error counter 66 back to zero so that an error signal is not emitted. Three consecutive cycles with errors must occur before an error signal is sent to the computer. The number of consecutive errors that must be detected prior to the forwarding of an error signal from the counter 66 to the computer 53 may be varied if desired.

The computer, upon demand, applies a voltage to hold the normally open gate 68 closed during the time it supplies the highspeed pulse train to register 60, in order to shift the information out of this register serially into the computer. The computer thus extracts from the register 60 the binary coded information representing the identity of the train, the identity of the calibration transmitter, and the number of revolutions that the axle at each end of the train has made since the start of its run. By means of the program stored in the computer, this number of revolutions is accurately interpreted as the location of each end of the train.

The relationship between the total wheel revolutions and the distance travelled by the train is obviously a function of wheel circumference, and this relationship is developed by periodically running the train over a calibration section of track while the computer automatically computes a corresponding factor. Since some wheel creepage or slippage can occur during operation of the train, the computer periodically re-references the train along its run on the basis of the portion of the binary coded location information received from register 60 and corresponding to the output of the train location calibration transmitter 41 when passed by the train (FIG. 8). Since the computer contains data on the known location of the train location calibration transmitter emitting the signal causing operation of the train location calibration receiver 46, the computer automatically computes a correction term by comparing this known location with the apparent location corresponding to the read-out of the encoder 31 on the related train. This correction term is then subsequently applied to the apparent location of the train to determine its actual location each time information is received from the train, and when the train passes another reference point at which a train location calibration transmitter is disposed, the correction term is again adjusted to represent actual conditions.

Each train in the system will be interrogated (or instructions will be sent to it and it will respond with its identity and location) in the order of once a second. The computer, by virtue of its stored program, can arithmetically determine the speed of the trains, since the computer keeps track of time continuously; thus, a change in location with respect to time is velocity. Knowing the velocity of each train and the relative locations of both ends of all trains and knowing the headway requirements (which have been entered into the computer and stored in its memory by the operator), the computer can determine arithmetically, on the basis of the information obtained from the trains and from the operator, the signal aspect and instruction that is appropriate for each train each time a signal aspect or instruction is sent to that train.

The computer constantly supervises the track switch positions through standard, well-known telemetering and switch control equipment 57 at the central office, and these positions, together with other conditions that may be imposed by the dispatcher through the manual control 54 of the computer, are used by the latter in preparing the signal aspect and operating instructions to be transmitted to each train. A Westinghouse Visicode Supervisory Control described in the Westinghouse bulletin No. 56–550 dated November 1959 is telemetering and switch control equipment capable of and intended for these purposes.

The above described automatic signalling and train control system operates as follows:

The information flow between each train and the related buffer unit 52 at the central office 10 is in the form of a continuously repeated cycle or loop which may be of from one-tenth to three seconds duration. Thus, the completion of the reception of coded information by the train initiates the transmission of coded information from the train to the related buffer unit at the central office, and, similarly, the completion of the reception of coded information at the central office from the train initiates the transmission of coded information from the central office to the train. Since the operating cycle is continuously repeated, the description thereof could start at any point in the cycle. However, for the purpose of convenience, the description of the operating cycle will commence at the point where the computer 53 has prepared binary coded information corresponding to the signal aspect and operating instructions to be sent to one of the trains which is identified by the initial portion of the coded information, it being understood that the computer simultaneously prepares binary coded information to be sent to all of the other trains.

The binary coded information corresponding to the signal aspect and operating instructions is fed from the computer to the register 69. Upon read-out of the register 69, the contents of the latter are fed both to the transmitting section of the related transceiver 51, for transmission to the train, and to register 64 where the information is stored. The transmitting section of 51 modulates the communication transceiver 50 which transmits the information to the related train.

The communication receiver 35 on board the train receives the binary coded information which consists of the identity of the train, the signal aspect to be displayed by the cab signal display 21 and the operating instructions for the automatic train operation relay bank 22.

The receiver 35 delivers the audio binary code to the frequency shift receiver 25 which in turns delivers the D.C. pulse code to the two-way gate 36 which is normally open in the direction toward the comparer 37. The binary bits of the identity are used to interrogate the identity set switch 33 through comparer 37 and counter 38 which then delivers the binary coded identity of the train on which the equipment is installed to the comparer 37. The identity corresponding to the output of switch 33 and the identity corresponding to the initial portion of the received binary information are compared in the comparer 37 and, if both identities match, the comparer 37 actuates the counter and control unit 38 which in turn switches the gate 36 so that the latter is then closed toward the comparer 37 and open toward the signal aspect and instruction register 32. Thus, at the end of the identity portion of the incoming binary coded information, the gate 36 is switched to read the second portion of such information into the register 32. When such information has been loaded into the register 32, the cab signal display 21 and automatic train operation relay bank 22 are correspondingly actuated to display the signal and to establish the operating conditions transmitted to the train, and further the register 32 sends a start pulse to the programmer 39, which thereafter causes a report to be sent back to the central office 10, as described below.

Upon reception of the start pulse from register 32, the programmer 39 energizes the communication transmitter 34, resets the two-way gate 36, closes the normally open gates 40 and 40' between the filter and one-shot pulse generators 28 and 28' and the digital encoders 30 and 30', interrogates register 47 and emits five pulse trains which function:

(a) To interrogate the identity set switch 33 so that the latter sends binary coded information to the frequency shift transmitter 24 corresponding to the identity of the train and the transmitter 24 then modulates the communication transmitter 34 to send binary coded information corresponding to the identity of the train back to the central office and, at the same time, opens gates 48 if it is closed.

(b) To effect the serial read out of binary register 31 to the frequency shift transmitter 24, with the read-out binary coded information corresponding to the identity of the train location calibration transmitter whenever passed and the location of the front end of the train in terms of wheel revolutions detected by the discrete signal generator 12.

(c) To effect the serial read-out binary register 31' which corresponds to the location of the rear end of the train in terms of wheel revolutions as detected by the discrete signal generator 12'.

(d) To effect the serial read-out of the actual conditions of the cab signal display 21 and the automatic train operation relay bank 22 for return to the central office where it is to be verified or checked against the signal aspect and operating instructions which were originally transmitted to the train; and (e) To open the previously closed gates 40 and 40' leading to the angular position digital encoders 30 and 30'.

This completes the transmission of the report to the central office, with such report consisting of the identity of the train, the identity of the train location calibration transmitter 41 passed by the train, the apparent locations of the front and back ends of the train, the signal aspect being displayed and the operating conditions then established.

Such information is transmitted, by way of the train communication system 49 to the related communication transceiver 50 and, by way of suitable filters, to the frequency shift transceiver 51 (FIG. 6) corresponding to the related train. The receiving section of the transceiver 51 sends such information to the related buffer unit 52, where the initial portion of the information corresponding to the identity of the train, the identity of the calibration transmitter passed by the train, and the locations of both ends of the train is sent through the normal side of gate 58 and through the normally open gate 59 to the register 60, and thence to the computer. The counter 61 counts the number of binary bits and, when the number of bits received equals the number included in the above described initial portion of the coded information, the gate 58 is operated to the switched position so that the remainder of the received binary coded information, that is, the information corresponding to the condition of the cab signal display 21 and the condition of the automatic train operation relay bank 22, is read into the register 62. When the loading of the register 62 is completed, the latter sends a start-pulse to the programmer 63. The programmer 63 then causes the contents of the register 62 (returned signal aspect and instruction) and of the register 64 (intended signal aspect and instruction) to be simultaneously read into the parallel half adders 65 and, in the event of any discrepancy or inequality therebetween, there is an output from the parallel half adders 65 which steps the error counter 66 one position and closes the normally open gate 67 between the programmer 63 and the error counter 66. The programmer 63 next sends a signal to the gate 67 which, if in its normally open condition, is passed therethrough in order to reset the error counter 66. The programmer 63 next operates to send a signal through the normally open gate 68 for initiating read-out of the register 69 signal aspect and instruction and to operate the transmitting section of the related transceiver 51 in order to send back to the related train binary coded information corresponding to the identity of the train and to the signal aspect and operating instructions which have been newly set up in the register 69 from the computer. Finally, the programmer 63 operates to open the gate 67 between the programmer and the error counter if such gate 67 had been previously closed in response to the detection of an error. As previously indicated, if errors are detected during these successive operating cycles, the error counter 66 then sends an error signal to the computer and the latter is effective to make corresponding changes in the signal aspect and operating instructions to be transmitted to the several trains.

It can be readily seen that, in the above described complete operating cycle, each step occurs in turn and is dependent upon the occurrence of the previous step. Therefore, any failure of any component in the continuous loop formed by the equipment on the train and the related buffer unit at the central office or station will serve to interrupt such loop and, when this happens, drop-out relay 32' will not be actuated periodically and it will drop out and cause register 21 to shift to a "stop" aspect and exercise corresponding "stop" control on the automatic relay bank 22. The equipment at the central office further detects any such failure, and takes action to send appropriate more restrictive or "stop" aspects to the cab signal displays and to the automatic train operation relay banks of all trains following the one in which the failure has occurred. Thus, the system embodying the present invention must fail safe.

Figure 9A:
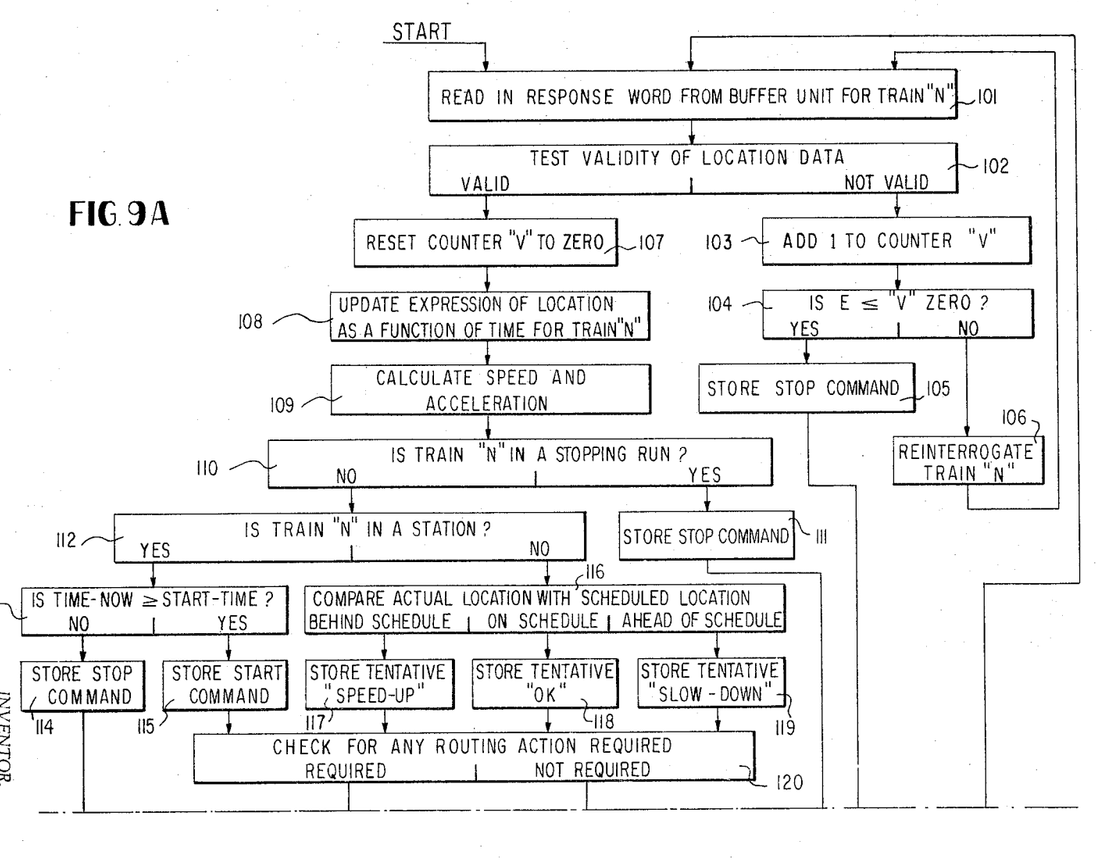
Figure 9B:
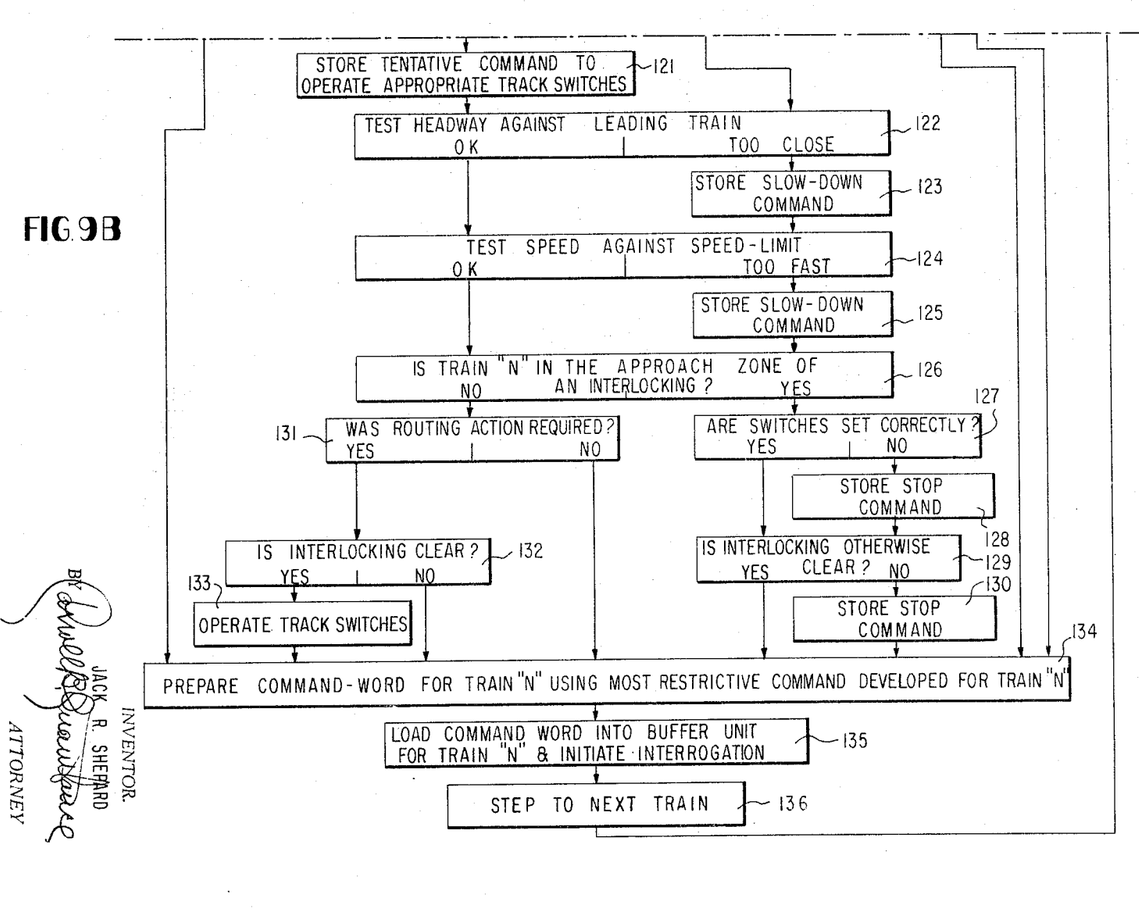

FIG. 9 shows, in simplified form a typical program flow chart for the computer 53. The computer activities for each train are in the form of an endless loop. The loop includes loading a command word into the train buffer; initiating transmission to the train; extraction of the received word from the train buffer and preparing the next word for transmission. For description, then, the loop can be entered at any point, but is entered here, as shown in the sketch, with box 101. The response word from the train is read from the buffer unit for the train into the computer. Box 102 tests the location data for reasonableness and validity. For instance, the location data must be consistent with reasonable movement of the train with respect to its past location. If the location data is not valid this fact is recorded by adding a 1 to counter "V" box 103. Box 104 tests the value standing in counter "V" to see if it is greater than or equal to a constant E. If the answer is "no," box 106 causes the train to be reinterrogated. Reinterrogation will reoccur until valid data is received in box 102 or until the answer in box 104 is "yes," and a stop command is stored in box 105. Assuming that valid data is received box in 102, box 107 resets counter "V" to 0. Box 108 will use past location data together with present location data to derive an expression of location as a function of time for this train. From this expression, speed and acceleration is calculated in box 109. A train is always either stopping for a station, or in a station, or neither. The question in box 110 is used to determine whether that train is in a stopping run or not: If the answer is "yes," box 111 stores a stop command. If the answer is "no," the question, "Is the train in a station?" is asked in box 112. If the answer is "yes," box 113 determines whether the train should start. If the answer is "no," box 114 stores a stop command. If the answer in box 113 is "yes," box 115 stores a start command.

In box 112, if the train was not in a station, box 116 compares the location of the train to its intended location with respect to its schedule. (The running schedule for each train has been previously stored in the machine.) Depending upon the train's location with respect to the schedule, boxes 117, 118 and 119 are used to either speed up the train, or not change its action, or to slow down the train.

Box 120 is a test to determine whether routing action through an interlocking is required. Several conditions must be met. First, is this train the next train that should use the interlocking? Second, is the interlocking properly set for this train? Third, are any other trains preparing to use this interlocking? If all conditions are not met then some routing action is required and box 121 stores tentative commands for appropriate track switches. If action is not required no commands are stored.

Box 122 is to test the headway between this train and the train ahead. If the headway is too close, box 123 stores a slow down command.

Box 124 tests the speed of this train against the speed limit of the section in which the train is operating. If the train speed is too fast, box 125 stores a slow down command.

Box 126 determines whether or not this train is in the approach zone of an interlocking. If the answer is "yes," box 127 determines whether or not the interlocking is properly set. If the answer is "no," box 128 stores a stop command. Box 129 determines whether or not the interlocking is otherwise clear. In other words, is the interlocking already occupied? Are other approach zones clear? Is the route fouled by another train? If the answer is "no" to box 124, box 130 stores a stop command.

In box 126, if this train is in the approach zone to an interlocking the question is asked whether routing action was required in box 121 or not. If the answer is "yes," box 132 determines whether or not the interlocking is clear for operation of track switches. If the interlocking is clear box 133 executes the commands stored by box 121.

Box 134 reviews all command words that have been stored for this train and selects the most restrictive command which is used to prepare the command word for this train. Box 135 loads the command word into the buffer unit for this train. Box 136 steps to the next train and returns to the same place as described above by returning to box 101. This process is repeated for each train and all trains are so treated in each second.

It will be apparent from the foregoing description of an illustrative embodiment of the invention, that such system notes the identity of each train and the location of the opposite ends thereof at frequent regular intervals so that highly accurate location information is always available on a current basis. From such information, the speed and acceleration of the several trains can be easily derived, and the separation of any train can be immediately detected. With the accurate locations of both ends of every train known at all times, the safe operating distance between any two trains travelling in the same direction can be easily determined by considering it, realistically, as a function of the speeds and operating characteristics of the two trains. Thus, the system embodying the invention provides for better, and far more realistic determination of safe operating headway, than do the existing automatic block signalling systems. The use of a high speed automatic computer or logic system 53 at the central office 10 to analyze all of the data received from the several trains, provides more accurate, dependable and frequent checks on both static and dynamic traffic conditions. Further, the system embodying the invention delivers information to each train which is current with respect to actual condition and which is constantly checked, at the central office or station, in order to insure its validity.

Although a particular embodiment of the invention has been described in detail herein with reference to the accompanying drawings, it is to be understood that the invention is not limited to that precise embodiment, and that various changes and modifications may be effected therein without departing from the scope or spirit of the invention, except as defined in the appended claims.

I claim:
1. An automatic signalling and train control system comprising:
   a track,
      a series of calibration signalling devices spaced along said track each producing a signal unique to the location thereof;
   a train on said track, said train having thereon a calibration signal receiver,
      first register means connected to said receiver producing an electrical code signal representing the signal received from the calibration signalling device last passed by said train,
      an electrical pulse generator associated with a wheel of said train to produce an output pulse for each increment of rotation of said wheel,
      a stepping device connected to the pulse generator to record the number of increments of rotation of said wheel,
      an encoder for translating the total of said increments into signals representing binary numbers,
      second register means connected to said encoder to produce an electrical code signal representing the total standing in said stepping device,
      a signal generator producing an electrical code signal unique to said train,
      third register means for producing electrical code signals respectively representing start, stop and running speed controls to be applied to said train,
      a report signal transmitter,
      a programmer including means to read the electrical code signals from said signal generator and all of said register means into said report signal transmitter in response to loading of said second register means,
      said third register means being adapted to operate a train control device for applying start, stop and running speed controls to said train in response to corresponding signals loaded into said third register means,
      an instruction signal receiver and means connected to said third register means for loading therein coded instruction signals received by said receiver,
   and a central station including
      a report signal and instruction signal transceiver, and a computer constituting means to analyze the coded report signals received from said train via said report signal transmitter and transceiver and to transmit said control and predetermined code signals thereto via said transceiver and instruction signal receiver, said control signals varying in accordance with differences between the actual position and a desired position of the train along said track.

2. An automatic signalling and train control system in accordance with claim 1, said automatic train control including a fail-safe means to shift said train control device to digressively decreasing train speed aspects in response to failure of said second register to receive control signals from said control signal receiver.

3. An automatic signalling and train control system in accordance with claim 2, said train including two sets of said pulse generators, stepping devices and second register means, one set associated with a forward wheel of the train and the other set associated with a rear wheel of the train, said computer also comprising a means to interpret the code signals from said first register means and said second register means in terms of wheel slippage, variations in wheel diameter, and train integrity.

4. An automatic signalling and train control system in accordance with claim 1, characterized by the fact that there are a plurailty of trains along said track; and said central station includes
a plurality of buffer units, one for each train, connected between said transceiver and said computer, each buffer unit constituting a means to receive and store report signals from a respective train, to receive and store instruction signals for the respective train from said computer, and to relay said report signals to the computer and relay said instruction signals to the transceiver.

5. An automatic signal and train control system in accordance with claim 4, each buffer unit including a report signal register for storing an instruction aspect signal last received from the train, a control signal register for storing the last control signal relayed therethrough from said computer, means for comparing said aspect signal and said control signal, and means for creating and transmitting to said computer an error signal varying in accordance with differences between said aspect and control signals.

6. An automatic signalling and train control system in accordance with claim 4, each buffer unit including a programmer operating after receipt of said predetermined number of code signals from said train to relay data corresponding thereto to said computer, the buffer unit programmer operating, upon feed back through said buffer units of said cycle of data bits, to transmit an actuating signal to the programmer on the train.

References Cited by the Examiner

UNITED STATES PATENTS

| | | |
|---|---|---|
| 2,460,597 | 2/1949 | Rodgers. |
| 2,535,162 | 12/1950 | Rodgers. |
| 2,783,369 | 2/1957 | Weber. |
| 2,948,234 | 8/1960 | Hughson __________ 246—30 X |
| 3,054,100 | 9/1962 | Jones _____________ 246—30 X |
| 3,072,785 | 1/1963 | Hailes ___________ 246—187 X |

FOREIGN PATENTS

| | | |
|---|---|---|
| 1,000,853 | 1/1957 | Germany. |
| 121,811 | 9/1958 | Russia. |
| 1,277,755 | 10/1961 | France. |

ARTHUR L. LA POINT, *Primary Examiner.*

LEO QUACKENBUSH, EUGENE G. BOTZ, S. B. GREEN, *Assistant Examiners.*